United States Patent [19]
Kuntman

[11] Patent Number: 6,154,169
[45] Date of Patent: Nov. 28, 2000

[54] SCAN MANAGEMENT AND AUTOMATIC TILT CONTROL FOR AIRBORNE RADARS

[75] Inventor: Daryal Kuntman, Bellevue, Wash.

[73] Assignee: Allied Signal, Morristown, N.J.

[21] Appl. No.: 09/348,649

[22] Filed: Jul. 6, 1999

Related U.S. Application Data

[60] Provisional application No. 60/092,025, Jul. 6, 1998.

[51] Int. Cl.$^7$ .................................................. G01S 13/95
[52] U.S. Cl. ............................................. 342/74; 342/26
[58] Field of Search .................................. 342/74, 75, 76, 342/26, 159

[56] References Cited

U.S. PATENT DOCUMENTS 5,198,819  3/1993  Susnjara ........................................ 342/26
5,392,048  2/1995  Michie .......................................... 342/75

OTHER PUBLICATIONS

Kemppinen et al.;Determining the Critical Pointing Error for Imaging Microwave Radiometers on Board Low Altitude Aircraft; 11–1998; IEEE Transactions on Geoscience and Remote Sensing, vol. 36; pp. 1991–1994.

*Primary Examiner*—Daniel T. Pihulic

[57] ABSTRACT

A method for automatically managing the scan and tilt of an airborne radar.

1 Claim, 1 Drawing Sheet

SCAN MANAGEMENT AND AUTOMATIC TILT CONTROL FOR AIRBORNE RADARS

This application claims priority from copending provisional application Ser. No. 60/092,025 titled: "Scan Management And Automatic Tilt Control For Airborne Radars" filed on Jul. 6, 1998.

BACKGROUND OF THE INVENTION

The present invention relates to airborne radars and more particularly to controllers for airborne radars. Radar is often sequenced through various scans, with each scan or set of scans dedicated to a particular one of the tasks performed by the radar. The scan sequence and the time alloted for each scan type limits the type and number of data gathering tasks the radar can support. In present airborne radars, below 1500 feet above ground level (AGL), the radar executes a four scan cycle. One scan gathers weather data and three scans detect windshear. Even at these current rates, the amount of weather data gathering capability is marginal. Additional data gathering tasks cannot, therefore be added to the radar scan schedule of existing radars without compromising weather radar performance.

Present day airborne radar systems also require that the pilot manually control the tilt angle of the radar antenna. One such example is described in "RDR-4B Forward Looking Windshear/Weather Avoidance Radar System Pilot's Manual with Radar Operating Guidelines", AlliedSignal Aerospace Commercial Avionics Systems, ACS-5082, Rev 1, July 1996, the entire contents of which are incorporated herein by reference.

The pilot manual describes the procedure for selecting the antenna tilt to scan for weather. This procedure requires the pilot to adjust manually the tilt of the antenna for each range scale until "a sprinkle of ground return" is visible at the far edge of the display. At the larger range scales (>80 nmi) the ground returns may not be visible making an optimal antenna tilt decision difficult due to the lack of terrain returns. At these ranges, it is difficult for the pilot to make a distinction between weather returns and strong ground clutter returns without continually adjusting the antenna tilt to see if the returns disappear as the antenna beam is adjusted upward. As the altitude of the aircraft changes with respect to target height, the antenna tilt angle must be adjusted to maintain the proper positioning of target returns. This requirement increases pilot workload, and presents possible difficulties in maximizing the effectiveness and utility of the radar system.

SUMMARY OF THE INVENTION

The present invention describes a method for automatically determining an optimal antenna tilt angle for all weather display ranges using a constant altitude scan, that eliminates the tilt change requirements. According to one embodiment of the present invention, the radar tilt control is managed as a function of flight phase and altitude.

The present invention also maximizes the useful data obtainable by the radar through management of the radar scan. According to one aspect of the present is invention, the invention compensates for aircraft motion through motion compensation of the radar display. Management of the scan and tilt functions of the radar as taught by the present invention enable the radar to perform additional data gathering functions. This additional data gathering many include terrain detection scans.

According to yet another aspect of the present invention, terrain detection scans are accommodated by employing ground-stabilization and reducing the actual weather scan update rate. A high apparent weather update rate is maintained by providing the automatic radar control of the invention.

DETAILED DESCRIPTION OF THE PREFERRED EMBODIMENT(S)

Figure 1:
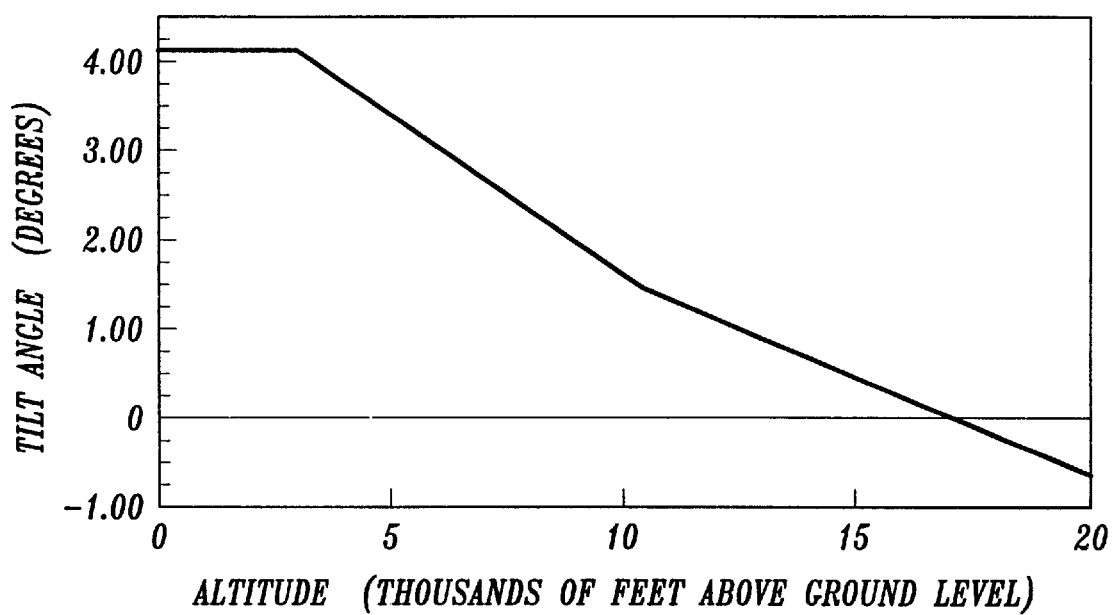

One embodiment of the present invention provides a frequency reduction in the weather scan rate. In a preferred embodiment, the scan rate is reduced from one weather scan every twelve seconds to one weather scan every minute. The scan time saved by this reduction is used for terrain detection or other data gathering scans. In another embodiment of the present invention, the data is ground-stabilized. Motion compensation, or ground-stabilization, of the weather function as taught by the present invention, enables the frequency of weather scans to be reduced while maintaining the apparent weather update rate substantially equivalent to the actual update rate of current radar systems: approximately once or twice every eight seconds. Ground stabilization of the weather scan function, enables reduction in the frequency requirement for weather scans, for example, from once every 12 seconds to once a minute. These types of slow update rates would not normally be acceptable to the flight crews, unless the data is ground stabilized and the apparent update rate of the weather information is almost as high as the current radars, once or twice every eight seconds. To maintain such high apparent update rate, the present invention radar automates radar controls.

In one possible embodiment of the invention, the radar presents constant altitude weather radar data. This presentation eliminates any tilt change requirements. At low altitudes, below 2500 ft. AGL, a single or dual tilt angle scan is sufficient to provide the optimum presentation. At higher altitudes, such as for example, FL400, to maintain the constant altitude, at for example a storm top elevation of, for example, FL200, six or seven scans might be required. At these altitudes there is no requirement for low level windshear scans, therefore there should be no additional loading of the system processing capability. A complete picture can be obtained within 30 seconds. Terrain detection scans, for example, can thus be interlaced with the weather scans with no detrimental effects on the presentation to the pilots. To further optimize the automatic constant altitude scans, a terrain data base (very low resolution) may be used as input to the radar controller.

In one preferred embodiment, the present invention controls the radar tilt angle as a function of aircraft flight phase and altitude. For example, the automatic tilt control may be scheduled to operate according to flight phase as follows:

Landing, Take-off and Climb (Below 20,000 ft. AGL:

During take-off and initial climb, until 2500 ft. AGL, a single scan for weather with+4 degree tilt is sufficient. Between 2500 ft. AGL and 10,000 ft. AGL, reduce tilt angle 0.25 degrees for each 750 ft. of climb. Between 10,000 ft. AGL and 20,000 ft. AGL, reduce tilt by 0.25 degrees for each 1250 ft. of climb. FIG. 1 graphically describes the automatic tilt schedule for take-off and climb.

Landing (Below 20,000 ft. AGL)

In FIG. 1, the landing automatic tilt schedule is the opposite of the climbing procedure. Between 20,000 and 10,000 feet AGL, the tilt angle is increased by 0.25 degrees for each 1250 feet descended. Between 10,000 and 2500 feet AGL, the tilt angle is increased by 0.25 degrees for each 750 feet descended. In one preferred embodiment of the invention, between 2500 feet AGL and landing, the invention uses a single scan for weather with a four-degree tilt.

Cruise (Above 20,000 ft. AGL):

Multiple scans are preferred for altitudes above 20,000 ft. AGL. The exact number of scans depend on the aircraft altitude. For ranges beyond line-of-sight, up to 320 nmiles, the tilt angle is calculated to center the beam at 20,000 ft. AGL at the line-of-sign range. For ranges below the line-of-sight, the tilt angles are calculated to keep the beam high enough to suppress returns from ground targets with equivalent of 50 dBZ (dBZ=log 10 [reflectivity factor Z] reflectivity, at the same time centering the beam around 20,000+/−2000 ft. The minimum tilt angle is preferably not below −10 degrees. The ranges which cannot be covered with 10 degree down tilt may be covered using ground stabilization.

Using the approach of the present invention, the short-range weather data observed by a flight crew at high altitudes is ground-stabilized with no real updates. For example, a range of 20 nm at FL 400 can be monitored without updates when ground-stabilization is applied.

The present invention solves several additional problems of the prior art. No longer are pilots required to set the radar's tilt angle in range scales that extend beyond the range at which the radar can reliably detect ground returns, thus pilot anxiety is reduced by the present invention. The present invention eliminates the risk of losing targets at close-in ranges and high altitudes due to over-scanning. Also, 160-degree scanning should be acceptable as long as 180-degree data presentation is maintained through ground-stabilization. The present invention reduces the need for the pilot to distinguish ground returns from weather returns at all range scales. The present invention reduces the need for the pilot to adjust the antenna tilt angle to compensate for mountainous terrain in all range scales. The present invention minimizes the need for the pilot to manually adjust the tilt angle while trying to fly the aircraft and navigate around hazardous terrain and weather. Instead, the pilot can spend more time analyzing storm patterns on the weather display. Furthermore, the reduced scan allows antenna size to be increased and the antenna drive to be simplified.

What is claimed is:

1. A method for scan management and tilt control of airborne radar comprising the steps of:

setting the radar tilt angle as a function of height above terrain;

storing a set of radar scan data as a function of aircraft projected flight path;

and a constant altitude radar scan results.

\* \* \* \* \*